United States Patent
Kim

(10) Patent No.: US 7,982,428 B2
(45) Date of Patent: Jul. 19, 2011

(54) APPARATUS AND METHOD OF RECHARGING A BATTERY USING A USB DEVICE IN A PORTABLE DEVICE

(75) Inventor: Hyoung Sup Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 12/129,456

(22) Filed: May 29, 2008

(65) Prior Publication Data

US 2009/0009140 A1    Jan. 8, 2009

(30) Foreign Application Priority Data

Jul. 5, 2007   (KR) .................. 10-2007-0067615

(51) Int. Cl.
*H01M 10/46* (2006.01)
(52) U.S. Cl. ........................ 320/111; 320/136
(58) Field of Classification Search .................. 320/107, 320/111, 114, 115, 134, 136
See application file for complete search history.

(56) References Cited

U.S. PATENT DOCUMENTS

| | | | |
|---|---|---|---|
| 6,798,175 B2 * | 9/2004 | Hanada et al. | 320/166 |
| 2004/0164708 A1 * | 8/2004 | Veselic et al. | 320/132 |
| 2007/0075683 A1 | 4/2007 | Chung et al. | |

FOREIGN PATENT DOCUMENTS

CN    1933280    3/2007

OTHER PUBLICATIONS

Dawei Zhu, A Charging controller for a Lithium-ion battery, LTC4053-4.2, Nov. 30, 2004, A New Type of Device, issue 11.

* cited by examiner

*Primary Examiner* — Edward Tso
(74) *Attorney, Agent, or Firm* — Jefferson IP Law, LLP

(57) ABSTRACT

An apparatus and a method of recharging a battery of a portable device using a USB are provided. In the method, a recharge unit of the portable device detects a voltage of the battery, and recharges the battery with a maximum recharge current of the USB. An amount of time for recharging a battery is shortened and power consumption for the recharging of the battery is reduced.

20 Claims, 4 Drawing Sheets

APPARATUS AND METHOD OF RECHARGING A BATTERY USING A USB DEVICE IN A PORTABLE DEVICE

PRIORITY

This application claims the benefit under 35 U.S.C.§119(a) of a Korean patent application filed in the Korean Intellectual Property Office on Jul. 5, 2007 and assigned Serial No. 2007-0067615, the entire disclosure of which is hereby incorporated by reference.

BACKGROUND OF THE INVENTION

1. Field of the Invention

The present invention relates to a portable device. More particularly, the present invention relates to an apparatus and a method of recharging a battery using a universal serial bus (USB) device in a portable device.

2. Description of the Related Art

Universal serial bus (USB) is a connection standard of computer peripheral devices developed by computer related companies for the interconnection between a computer and peripheral devices. When a computer is powered on and peripheral devices such as a printer, a scanner, a monitor, a mouse, and the like are connected to the computer, USB enables the automatic recognition of the peripheral devices. Thus, there is no need to reboot the computer for the connection of the peripheral devices to the computer. Moreover, a USB port is faster and smaller than the legacy parallel and serial ports used in the connection of peripheral devices. In addition, USB enables the connection of up to 127 peripheral devices when a USB hub is used. Further, USB can supply an electric current of 500 mA when operating according to its conventional specification and 100 mA when operating according to its low power specification. Thus, USB can be used as a power supply.

In order to use USB for recharging a battery, a recharge circuit is needed. Exemplary recharge circuits include a USB charger integrated circuit (IC) made by IC manufacturers or a field effect transistor (FET).

The USB charger IC is a stable circuit, but is expensive and difficult to configure due to its complexities. The FET is less expansive, but a range of a voltage to be recharged is so wide that a sufficient current cannot be supplied to a battery.

Conventionally, the recharging of a battery using a battery recharge circuit is performed by supplying a USB recharge current to the battery when the USB voltage supplied from a USB power supply is higher than a voltage of the battery. In this case, a voltage of a discharged battery, which is low enough for the portable device to be automatically turned off, is not 0 V (complete discharge voltage) but about 3 V. A conventional USB recharge circuit is designed to recharge a battery with a maximum USB current when the battery is at 0 V and to recharge the battery with a minimum USB current when the battery is at 5 V. Thus, when a battery is discharged to 3 V and a portable device is automatically turned off, since a conventional USB recharge circuit supplies half of the maximum recharge current of the USB to the battery, it is not effective.

SUMMARY OF THE INVENTION

An aspect of the present invention is to address at least the above-mentioned problems and/or disadvantages and to provide at least the advantages described below. Accordingly, an aspect of the present invention is to provide an apparatus and a method of recharging a battery, in a portable device having a recharging unit, with a maximum recharging current of universal serial bus (USB) when the recharging unit detects a voltage of the battery and the detected voltage is a preset maximum recharging voltage.

Another aspect of the present invention provides an apparatus and a method of recharging a battery, in a portable device having a recharge unit, with a recharge current higher than that of an existing recharge circuit when the recharge unit detects a voltage of the battery and the detected voltage exceeds a preset maximum recharge voltage and is lower than a full recharge voltage.

In accordance with an exemplary embodiment of the present invention, an apparatus for recharging a battery of a portable device is provided. The apparatus includes a voltage detector for detecting a voltage of the battery and for generating a signal for turning on a switch when the detected voltage is a voltage within a specific range, a manipulator for receiving the signal from the voltage detector and for manipulating the switch, a switch unit for turning the switch one of on and off based on the manipulator, and a resistor for adjusting a quantity of an electric current to be supplied to the battery.

In accordance with another exemplary embodiment of the present invention, a method of recharging a battery of a portable device is provided. The method includes detecting a voltage of the battery by a recharge unit of the portable device, and recharging the battery with a maximum recharge current when the detected voltage of the battery is a preset maximum recharge voltage.

In accordance with another exemplary embodiment of the present invention, a method of recharging a battery of a portable device is provided. The method includes determining, by a recharge unit of the portable device, a voltage of the battery, recharging, by the recharge unit, the battery with a maximum recharge current when the voltage of the battery is a preset maximum recharge voltage as a result of the determination, and recharging, by the recharge unit, the battery with a recharge current based on the voltage of the battery when the voltage of the battery exceeds the preset maximum recharge voltage and is lower than a full recharge voltage as a result of the determination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A portable device having a recharge apparatus according to exemplary embodiments of the present invention may be any information and communication appliance or multimedia appliance, such as a mobile telecommunication terminal, a digital broadcast receiving terminal, an MPEG audio layer-3 (MP3) player, a portable multimedia player (PMP), a digital camera, a navigation terminal, a personal digital assistant (PDA), a smart phone, an international mobile telecommunications 2000 (IMT 2000) terminal, a wideband code division multiple access (WCDMA) terminal, a universal mobile telecommunications system (UMTS) terminal, and the like.

Hereinafter, a portable device having a recharge unit according to exemplary embodiments of the present invention will be described in detail with reference to accompanying drawings.

Figure 1:
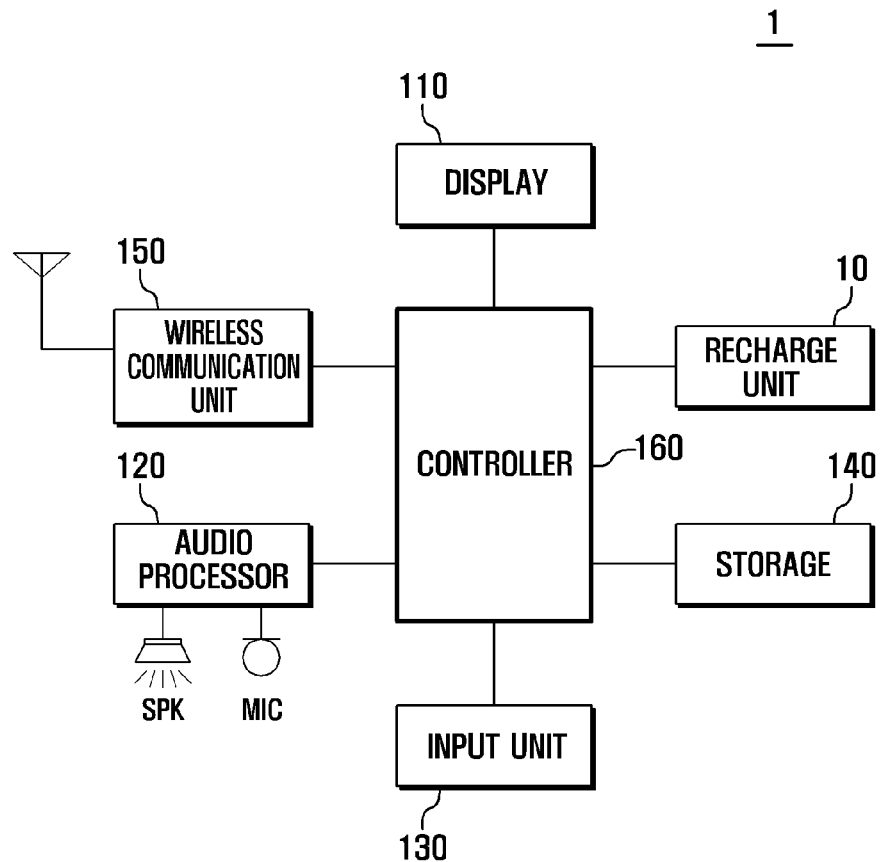
FIG. 1 is a schematic block diagram illustrating an internal configuration of a portable device having a recharge unit according to an exemplary embodiment of the present invention.

FIG. 1 is a schematic block diagram illustrating an internal configuration of a portable device having a recharge unit according to an exemplary embodiment of the present invention.

Referring to FIG. 1, the portable device 1 includes a display 110, an audio processor 120, an input unit 130, a storage 140, a wireless communication unit 150, and a controller 160. The portable device 1 further includes a recharge unit 10.

The display 110 may be implemented by a liquid crystal display (LCD), and in this case, may include a control unit controlling the LCD, a video memory storing image data, and devices for the LCD.

The audio processor 120 reproduces an audio signal output from the controller 160 and transmits an audio signal such as voice input through a microphone to the controller 160.

The input unit 130 includes a plurality of input keys and function keys for receiving number and text information and for setting various functions. The function keys may include arrow keys, side keys, and short keys, defined to perform specific functions.

The storage 140 may include a program region and a data region. Here, in the program region, an operating system (OS) for the portable device 1 and application programs necessary for other optional functions of the portable device 1 may be stored. Moreover, in the data region, user data, created when the user operates the portable device 1, such as a music file, a moving picture file, and the like may be stored.

The wireless communication unit 150 performs outgoing and receiving communication functions of the portable device 1. Here, the wireless communication unit 150 may include a frequency converter for converting a frequency of an outgoing signal up and for converting a frequency of an incoming signal down and a duplexer for separating signals transmitted and received through an antenna.

The controller 160 controls an overall operation of the portable device 1 and signal flow between inner components of the portable device 1. That is, the controller 160 controls signal flows between respective components such as the display 110, the audio processor 120, the input unit 130, the storage 140, and the wireless communication unit 150. Moreover, the controller 160 performs respective functions of the portable device 1 according to an input signal (for example, a key input signal, a touch event indicating a touch of a touch screen, and the like) input from the input unit 130, and displays information, such as a current status when the performance of the functions is performed and a user menu, through the display 110.

The recharge unit 10 controls a recharge and a discharge of a battery provided with the portable device 1. In general, a recharge of a battery is performed by supplying a recharge current to the battery. When a voltage and a current are applied to the portable device 1 from a power supply, the portable device 1 compares the voltage applied to the portable device 1 with a voltage of the battery. In this case, when the voltage applied to the portable device 1 is higher than the voltage of the battery, the recharge unit 10 recharges the battery with the current applied to the portable device 1. On the other hand, when the voltage applied to the portable device 1 is lower than the voltage of the battery, the current applied to the portable device 1 is not supplied to the battery Accordingly, the battery is not recharged.

The recharge unit 10 in the exemplary embodiment of the present invention recharges the battery with a USB recharge current supplied from a USB power supply. When a USB voltage is supplied, the recharge unit 10 detects a voltage of the battery. As a result of detecting the voltage, when the voltage of the battery is within a specific range, the recharge unit 10 begins to recharge the battery with a recharge current corresponding to the detected voltage of the battery. By doing so, in this exemplary embodiment of the present invention, a battery may be recharged by reducing a recharge time.

For example, in a case where a preset maximum recharge voltage is 3 V, when a detected voltage is 3 V, the recharge unit 10 begins the recharging at a maximum recharge current of 500 mA. Moreover, when the detected voltage is 3.7 V, the recharge unit 10 may begin the recharging at a maximum recharge current of 210 mA corresponding to the detected voltage.

In other words, when the detected voltage of the battery is the preset maximum recharge voltage or lower, the recharge unit 10 may recharge the battery with the maximum recharge current. Moreover, when the voltage of the battery is lower than a full recharge voltage but exceeding the preset maximum recharge voltage, the recharge unit 10 may recharge the battery at a recharge current corresponding to the detected voltage. Therefore, in cases where the voltage of a battery is lower than the preset maximum recharge voltage, the battery may be recharged with a higher current in comparison to the conventional battery recharging manner.

It is preferred that the specific range of a voltage be lower than the full recharge voltage but higher than the preset maximum recharge voltage.

The preset maximum recharge voltage is a reference voltage determined between an over-discharge protection voltage of the battery and a voltage when the portable device is automatically turned off according to a design of the battery. Preferably, a voltage between 2.4 V to 3V may be selected according to characteristics of a battery. However, depending on the design, types and characteristics of the battery provided with the portable device 1, the preset maximum recharge voltage may be a voltage other than 2.4 V to 3V.

The over-discharge protection voltage is a voltage at which point a protection circuit installed in the battery stops the discharging of the battery, which is preferably 2.4 V. However, the over-discharge protection voltage is not limited to 2.4 V, but may be another voltage according to a type and characteristics of a battery provided with the portable device 1. A voltage at which point the portable device 1 is automatically turned off may be 3 V. However, this voltage is not limited to 3 V, but may be another according to a type and characteristics of a battery provided with the portable device 1. For example, when the battery is discharged to a voltage at which point the portable device 1 is automatically turned off, the controller 160 outputs a message "The battery is low. The device will be automatically turned off." on a display, and may then turn the portable device 1 off.

The protection circuit, in order to prevent the battery from being damaged due to the over-discharge, stops the discharging of the battery when a voltage of the battery drops to the over-discharge protection voltage (2.4 V in this example). Moreover, the protection circuit, in order to prevent the battery from exploding due to over-recharge, stops the recharging of the battery when the battery is fully recharged.

The full recharge voltage is a voltage at which point the battery is fully recharged, preferably 4.2 V. However, the full recharge voltage is not limited to 4.2 V, but may be changed according to a type and characteristics of a battery provided with the portable device 1.

Moreover, the maximum recharge current is a maximum current which the USB power supply can supply to the battery, and may be changed according to a type and characteristic of a battery provided with the portable device 1. For example, a recharge current such as 100 mA, 500 mA, and the like may be applied to the battery of the portable device 1 based on a USB specification according to a type and characteristic of the battery provided in the portable device 1. Hereinafter, a case in which the maximum recharge current is 500 mA will be described in an exemplary embodiment of the present invention.

Figure 2:
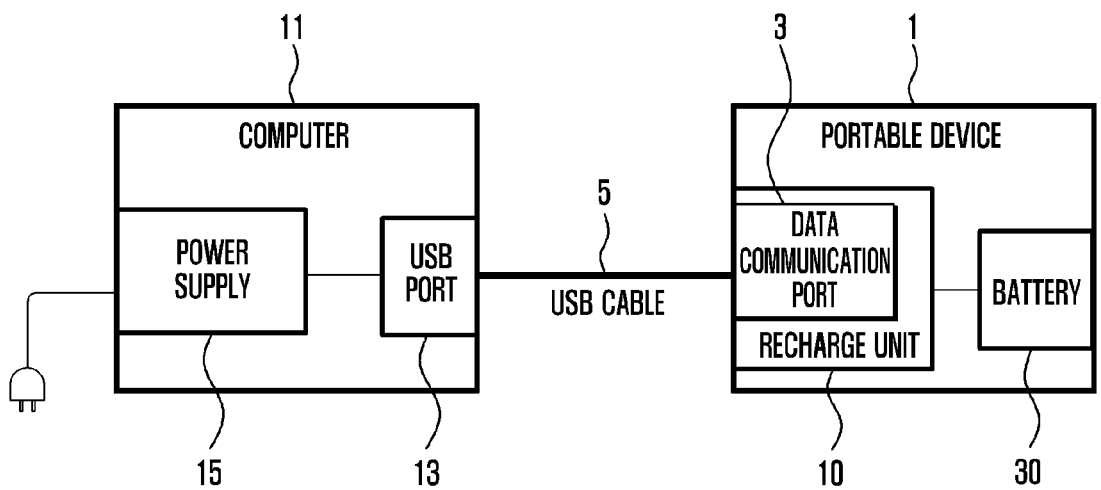
FIG. 2 is a view illustrating a connection between a portable device and a computer according to an exemplary embodiment of the present invention.

FIG. 2 is a view illustrating a connection between a portable device and a computer according to an exemplary embodiment of the present invention. Referring to FIG. 2, a data communication port 3 of the portable device 1 is connected to a USB port 13 of the computer 11 through a USB cable 5, and carries data and electric power supplied from the computer 11, to the portable device 1.

The data and the electric power are carried as follows.

When the computer 11 receives an AC voltage, a switching mode power supply (SMPS) 15 provided in the computer 11 converts the AC voltage into a DC voltage. In this case, the converted DC voltage, that is, a USB voltage is supplied to the data communication port 3 of the portable device 1 through the USB cable 5. The data communication port 3 in turn supplies the USB voltage to recharge unit 10 which then recharges a battery 30 of the portable device 1. In this example, a maximum USB voltage to be supplied to the portable device 1 is 5 V, and a maximum USB current is 500 mA according to the USB specification.

The USB cable 5 includes four wires such as a positive voltage (V+) wire, a negative voltage (V−) wire, and D+ and D− differential signal wires.

The USB voltage is applied to the battery 30 through the positive voltage (V+) wire and the negative voltage (V−) wire of the USB cable 5. In this case, the negative voltage (V−) wire is connected to ground (GND) of a recharge circuit to be grounded, and the positive voltage (V+) wire delivers the USB voltage to a recharge circuit 21 of FIG. 3 to be described later. The differential signal wires deliver the data to a USB controller of FIG. 3 to be described later.

Figure 3:
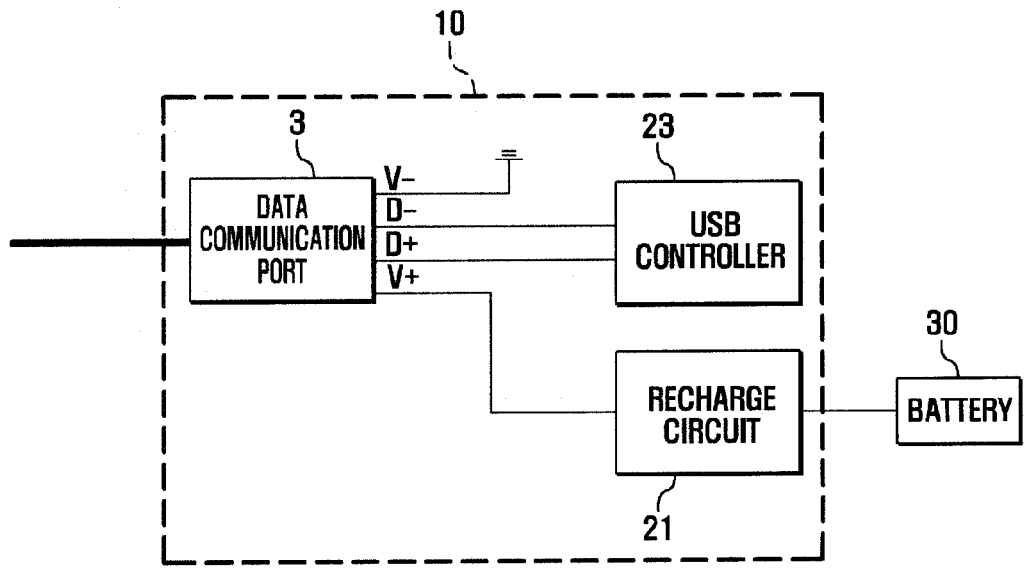
FIG. 3 is a view illustrating the recharge unit and a battery in FIG. 2.

FIG. 3 is a view illustrating the recharge unit and the battery in FIG. 2.

Referring to FIG. 3, the recharge unit 10 includes a data communication port 3, a recharge circuit 21, and a USB controller 23.

The data communication port 3 is a terminal for the connection between the portable device 1 and the USB cable 5, and functions to carry electric power and data, supplied from the computer 11, to the portable device 1.

The USB controller 23 receives and processes the data delivered from the computer 11 to the portable device 1, and transmits data stored in the storage 140 of the portable device 1 to the computer 11.

The battery 30 supplies the electric power to the portable device 1. The battery, used in this exemplary embodiment of the present invention, may be a rechargeable battery such as Ni-Cad battery, a Ni-MH battery, a Li-ion battery, and a Li-polymer battery.

In the exemplary embodiment of the present invention, a recharging operation of the Li-ion battery, which is most widely adopted for use with portable devices, will be described. A rated voltage of the Li-ion battery is 3.7 V. A voltage at which point the Li-ion battery is discharged such that the portable device is automatically turned of is 3 V. A full recharge voltage of the Li-ion battery is 4.2 V.

The Li-ion battery includes a protection circuit. The protection circuit intercepts a voltage flow when a voltage of the Li-ion battery is higher than the full recharge voltage. For example, when a voltage of the Li-ion battery is higher than 4.2 V, that is, the full recharge voltage, electrolyte in the Li-ion battery is decomposed and may explode. Moreover, when the Li-ion battery is discharged lower than 2.4 V, the electrolyte, that is the current collector of a cathode of the battery 30, melts which in turn deteriorates the performance of the battery. In order to protect the Li-ion battery from the above-mentioned risks, a protection circuit is installed in the Li-ion battery.

The recharge circuit 21 detects a voltage of the battery 30 and may recharge the battery 30 with the maximum recharge current of the USB when the voltage of the battery 30 is the preset maximum recharge voltage. The recharge circuit 21 may include a voltage detector, a manipulator, a switch, and a resistor, and will be described in detail later with reference to FIG. 4.

A conventional configuration of the recharge circuit 21 adopted in the exemplary embodiment of the present invention has been described. Hereinafter, an internal configuration of the recharge circuit 21 will be described in detail with reference to FIG. 4.

Figure 4:
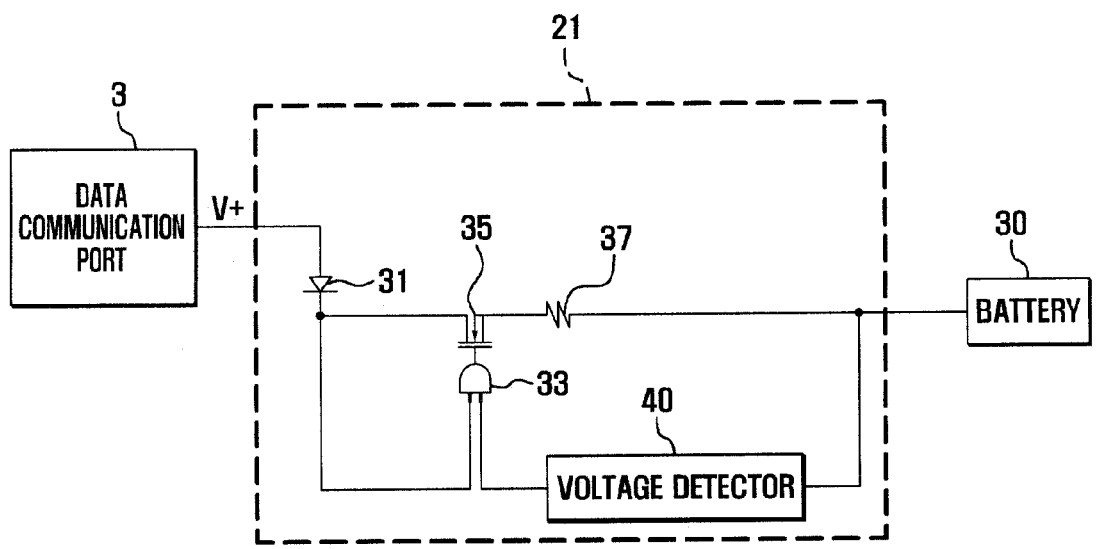
FIG. 4 is a view illustrating an internal configuration of a recharge circuit in FIG. 3.
Figure 5A:
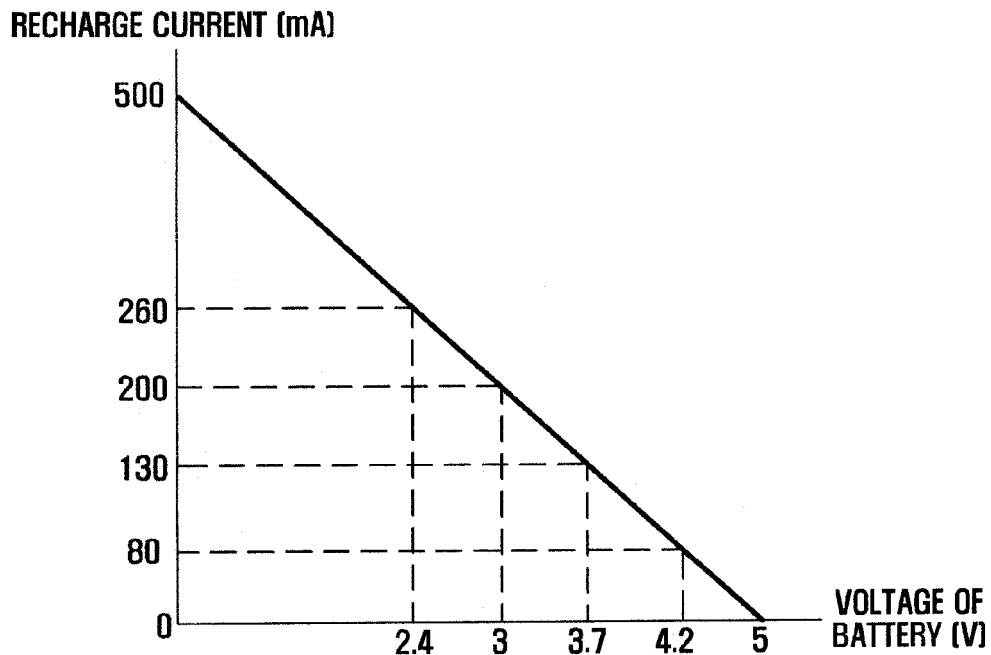
FIGS. 5A and 5B are graphs showing a relationship between a recharge current and a voltage of a battery.
Figure 5B:
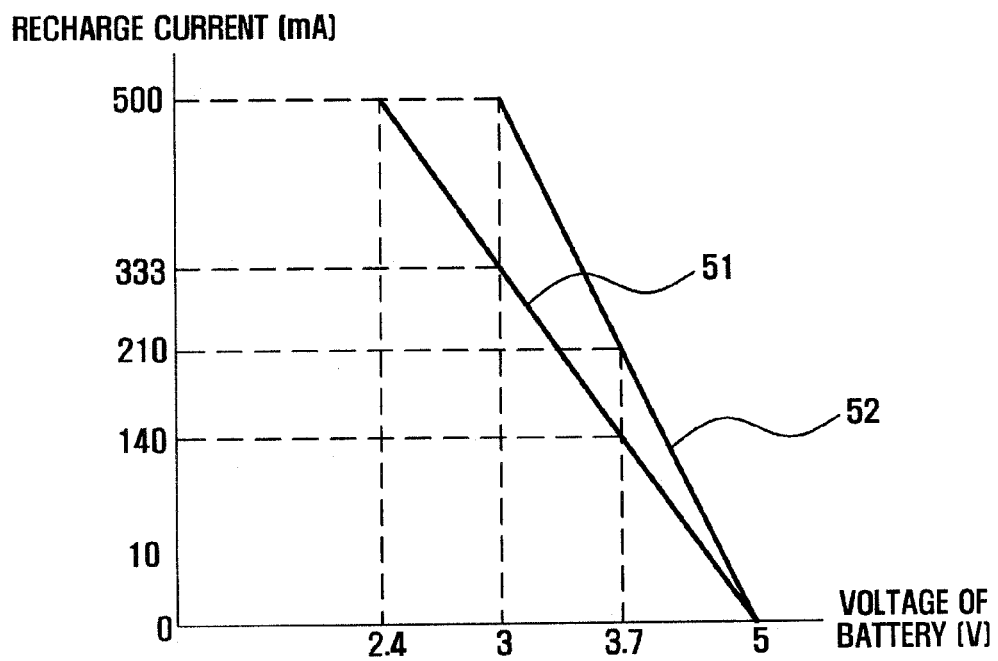

FIG. 4 is a view illustrating an internal configuration of the recharge circuit in FIG. 3, and FIGS. 5A and 5B are graphs showing a relationship between a recharge current and a voltage of a battery.

Referring to FIG. 4, the recharge circuit 21, includes a voltage detector 40 detecting a voltage of the battery 30, a manipulator controlling a switch unit, the switch unit adjusting a flow of a recharge current, a resistor 37 adjusting a quantity of the recharge current, and a diode 31 adjusting a USB voltage supplied to the portable device 1.

The diode 31 drops the USB voltage supplied to the portable device 1 by as much as 0.7 V to prevent the battery 30 from being further recharged when the battery 30 is fully recharged. The diode 31 may prevent the recharge current from flowing back from the portable device 1 to the computer 11.

The manipulator manipulates the switch unit with a signal applied from the voltage detector 40 when the USB voltage is supplied to the recharge circuit 21.

The manipulator, in this exemplary embodiment of the present invention, is described by an AND gate 33 as a logic gate to output a signal only when signals are input through all inputs, but the manipulator is not limited to this implementation. Therefore, the manipulator in this exemplary embodiment of the present invention may adopt a logic gate producing an output signal for controlling all the switches by determining input signals, such as an OR gate, a NOT gate, a NAND gate, and a NOR gate, an expanded type of the gates, and a modified type thereof.

The switch unit switches on/off with a signal applied from the manipulator to control the flow of the recharge current.

In this exemplary embodiment of the present invention, an N-channel metal oxide semiconductor (NMOS) 35 will be described as a switch adopted in the switch unit, but the switch unit is not limited to implementation. The switch employed in this exemplary embodiment of the present invention is a hardware device selectively delivering a signal from one side to another side, such as a transistor, a complementary metal oxide semiconductor (CMOS), a P-channel metal oxide semiconductor (PMOS), a bipolar junction transistor (BJT), a toggle switch, an expanded type of the devices, and a modified type thereof. A drain end, a gate end, and a source end, when the NMOS is substituted by the BJT, may correspond to an emitter, a base, and a collector, respectively.

The resistor 37 functions to adjust the recharge current to be supplied to the battery 30. In particular, when a voltage of the battery 30 is determined to be the preset maximum recharge voltage from the over-discharge protection voltage (2.4 V) to a voltage (3 V) when the portable device 1 is automatically turned off, it is preferred that the resistor 37 is configured such that a maximum recharge current of the USB corresponding to the preset maximum recharge voltage is supplied to the battery 30.

For example, when the preset maximum recharge voltage is 2.4 V and the maximum recharge current is set as 500 mA at the voltage 2.4 V, the resistor 37 may have a resistance of 3.6 Ohm (R1) according to Ohm's law. When a voltage of the battery 30 is substantially the same as the preset maximum recharge voltage, R1 can be expressed by the following equation 1.

$$R1=(V1-V2)/I=(4.3-2.4)/0.5=3.6 \qquad \text{Equation 1}$$

where, V1 is a USB voltage that is dropped by 0.7 V due to the diode 21, V2 is a present voltage of the battery 30, and I is a maximum recharge current to be supplied from the USB power supply to the portable device 1. The value of R1 calculated above is the resistance value when the voltage of the battery 30 is 2.4 V.

In another example, when the preset maximum recharge voltage is 3 V and the maximum recharge current is set as 500 mA, the resistor 37 may have a resistance of 2.4 Ohm (R2). When a voltage of the battery 30 is substantially the same as the preset maximum recharge voltage, that is, 3 V, R2 can be expressed by the following equation 2.

$$R2=(V1-V3)/I=(4.3-3)/0.5=2.4 \qquad \text{Equation 2}$$

where, V1 is a USB voltage that is dropped by 0.7 V due to the diode 21, V3 is a voltage of the battery 30, and I is the maximum recharge current to be supplied from the USB power supply to the portable device 1. The value of R2 calculated above is the resistance value when the voltage of the battery 30 is 3 V.

Meanwhile, in a portable device including a device for checking a voltage of the battery 30 and a resistance adjuster for adjusting a resistance of a variable resistor, the resistor 37 may be substituted by a variable resistor, the resistance of which can be varied according to a voltage of the battery 30. In this case, the variable resistor preferably has a range of resistance from 0.2 Ohm (resistance (R3) when a voltage of the battery is 4.2 V, that is, a full recharge voltage) to 3.6 Ohm (resistance (R1) when a voltage of the battery is 2.4 V, that is, the over-discharge protection voltage).

When a voltage of the battery 30 is substantially the same as the full recharge voltage, that is, 4.2 V, R3 can be expressed by the following equation 3.

$$R3=(V1-V4)/I=(4.3-4.2)/0.5=0.2 \qquad \text{Equation 3}$$

where, V1 is a USB voltage that is dropped by 0.7 V due to the diode 21, V4 is a voltage of the battery 30, and I is the maximum recharge current to be supplied from the USB power supply to the portable device 1. The value of R3 calculated above is the resistance value when a voltage of the battery 30 is 4.2 V.

An example in which the recharge unit 10 recharges the battery 30 with the maximum recharge current within the range of resistance will be described with reference to FIGS. 5A and 5B as follows. In graphs of FIGS. 5A and 5B, when a voltage of the battery 30 is a rated voltage of 3.7 V, it is understood that 130 mA is supplied to the battery 30 as shown in FIG. 5A, 140 mA is supplied as indicated by a first line 51, and 210 mA is supplied as indicated by a second line 52, respectively. However, when the variable resistor is provided in the recharge circuit 21, in this exemplary embodiment of the present invention, to adjust the resistance to 1.2 Ohm (R4), the recharge unit 10 can recharge the battery 30 with the maximum recharge current at 3.7 V.

When a voltage of the battery 30 is 3.7 V, R4 can be expressed by the following equation 4.

$$R4=(V1-V5)/I=(4.3-3.7)/0.5=1.2 \qquad \text{Equation 4}$$

where, V1 is a USB voltage that is dropped by 0.7 V due to the diode 21, V5 is a voltage of the battery 30, and I is a maximum recharge current to be supplied from the USB power supply to the portable device 1. The value of R4 calculated above is the resistance value when a voltage of the battery 30 is 3 V.

In other words, by using the variable resistor, when a voltage of the battery 30 is greater than the over-discharge protection voltage (2.4 V) and lower than the full recharge voltage (4.2 V), the battery 30 can be recharged with the maximum recharge current by adjusting the resistance adjuster. Therefore, a recharging time of the battery 30 is shortened and power consumption for the recharge is reduced.

The voltage detector 40 detects a voltage of the battery 30. When the voltage of the battery 30 is within a specific range, the voltage detector 40 detects the voltage of the battery 30 and outputs a signal for turning a switch on.

When the voltage detector 40 detects a voltage greater than the preset maximum recharge voltage (preferably, the over-discharge protection voltage (2.4 V)) and lower than a voltage (3 V) when the portable device 1 is automatically turned off, the recharge unit 10 may recharge the battery 30 with the maximum recharge current. Moreover, when a voltage of the battery 30 is between the preset maximum recharge voltage and the full recharge voltage (4.2 V), the recharge unit 10 recharges the battery 30 with a recharge current higher than in the existing USB recharging manner so that the recharge time can be shortened. This will be described in detail with reference to the graphs illustrated in FIGS. 5A and 5B.

A battery recharge efficiency of the recharge circuit 21 employed in the exemplary embodiment of the present invention will be described with reference to the graphs illustrated in of FIGS. 5A and 5B as follows.

FIG. 5A is a graph showing a relationship between the recharge current and a voltage of the battery in a conventional recharge circuit, and FIG. 5B is a graph showing relationships between the recharge current and a voltage of the battery in the recharge circuit employed in this exemplary embodiment of the present invention. In FIG. 5B, the first line 51 indicates a relationship between a recharge current and a voltage of a battery when the preset maximum recharge voltage is 2.4 V, and the second line 52 indicates a relationship between a recharge current and a voltage of a battery when the preset maximum recharge voltage is 3 V.

Referring to FIG. 5A and the first line 51 of FIG. 5B, when a voltage of the battery 30 is 2.4 V, a recharge current is 260 mA in the first line 51 of FIG. 5A and 500 mA in FIG. 5B. The conventional recharge circuit is designed such that the maximum recharge current of 500 mA is supplied at 0 V when the battery 30 is completely discharged and is decreased as the voltage of the battery 30 increases thereafter. Therefore, at the voltage of the battery of 2.4 V when the discharge is interrupted by the protection circuit installed in the battery 30, the conventional recharge circuit supplies only a recharge current of 260 mA to the battery 30. On the other hand, the recharge circuit 21 employed in this exemplary embodiment of the present invention is designed to supply the maximum recharge current of 500 mA to the battery 30 when the voltage detector 40 detects the preset maximum recharge voltage of 2.4 V. Therefore, the battery 30 can be recharged with a recharge current 1.9 times that used by the conventional recharge circuit.

Moreover, referring to FIG. 5A and the second line 52 of FIG. 5B, when a voltage of the battery 30 is 3 V, the recharge current is 200 mA in FIG. 5A and 500 mA in the second line 52 of FIG. 5B. The conventional recharge circuit is designed such that the maximum recharge current of 500 mA is supplied when the battery 30 is completely discharged, that is, 0 V and is decreased as the voltage of the battery 30 increased. Therefore, in a case of 3 V, a voltage of the discharged battery which is low enough for the portable device 1 to be automatically turned off, the conventional recharge circuit supplies only the recharge current of 200 mA to the battery 30. On the other hand, the recharge circuit 21 employed in the exemplary embodiment of the present invention is designed to supply the maximum recharge current to the battery 30 when the voltage detector 40 detects the preset maximum recharge voltage. Therefore, by using the recharge circuit 21, the battery 30 can be recharged with a recharge current 2.5 times that of the conventional recharge circuit.

In other words, in a case of using the recharge circuit 21 employed in these exemplary embodiments of the present invention, when the preset maximum recharge voltage is determined within a range from 2.4 V to 3 V, a recharge current 1.9 times to 2.5 time that of the conventional recharge circuit can be supplied to the battery 30.

Moreover, even after the preset maximum recharge voltage, the recharge circuit employed in the exemplary embodiments of the present invention can supply a recharge current much more than that of the conventional recharge circuit to the battery 30. For example, referring to graphs of FIGS. 5A and 5B, it can be identified that a recharge current much more than that of the conventional recharge circuit is supplied to the battery 30. Therefore, the recharging time of the battery 30 is shortened and power consumption for the recharging of the battery 30 is reduced.

Figure 6:
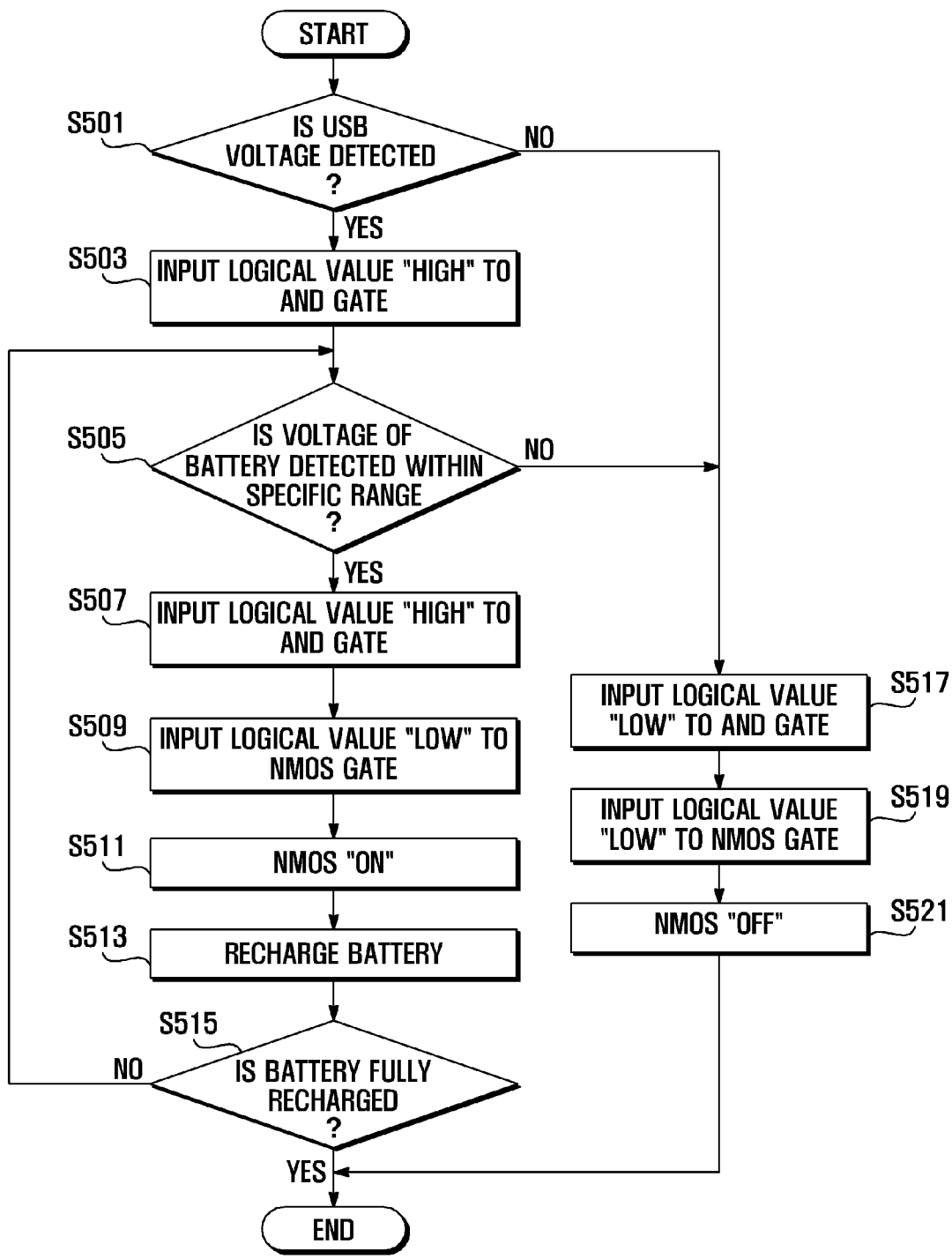
FIG. 6 is a flow chart illustrating an operation of recharging a battery according to an exemplary embodiment of the present invention.

FIG. 6 is a flow chart illustrating an operation of recharging the battery 30 according to an exemplary embodiment of the present invention.

Referring to FIG. 6, the recharge unit 10 detects the USB voltage applied to the portable device 1 in step S501. When the USB voltage is detected in step S501, the diode 31 drops the USB voltage by 0.7 V to 4.3 V in order to prevent an excessive recharge current from being supplied to the battery 30. When the USB voltage of 4.3 V, after the diode 31, is supplied to the recharge circuit 21, the recharge unit 10 applies a logical value of "HIGH" to the AND gate 33 in step S503. Meanwhile, when the USB voltage is not detected in step S501, the recharge unit 10 inputs a logical value of "LOW" to the AND gate 33 in step S517 and proceeds to a next step.

In step S505, the recharge unit 10 determines whether a voltage of the battery 30 is a voltage within a specific range. The voltage within the specific range indicates a voltage from the preset maximum recharge voltage to the full recharge voltage (4.2 V). When a voltage of the battery 30 is a voltage within the specific range, the recharge unit 10 inputs a logical value of "HIGH" to the AND gate 33 in step S507. However, when the voltage of the battery 30 is not with the specific range, the recharge unit 10 inputs a logical value of "LOW" to the AND gate 33 in step S517 and proceeds to a next step.

The AND gate 33 detects when all of the logical values of the USB voltage and the battery 30 are "HIGH", and inputs a logical value of "HIGH" to a gate end of the NMOS 35 in step S509. When the logical value of "HIGH" is applied to the gate end, the NMOS 35 is turned on in step S511 to establish an N-channel through which the recharge current flows.

The recharge unit 10 supplies the recharge current flowing through the NMOS 35 to the battery 30 in step S513. When the recharge current flows through the inside of the battery 30, electrons are supplied to the cathode of the battery 30 and the recharge of the battery 30 begins. The recharge continues until a voltage of the battery 30 increases to the point that the battery 30 is fully recharged in step S515. When the battery 30 is fully recharged, the recharge is finished.

When the recharge unit 10 does not detect the USB voltage in step S501 or a voltage of the battery 30 is not within the specific range in step S505, the recharge unit 10 inputs a logical value of "LOW" to the AND gate 33 in step S517. When the logical value of "LOW" is input to the AND gate 33, the AND gate 33 inputs a logical value of "LOW" to a gate end of the NMOS 35 in step S519. When the logical value of "LOW" is input to the gate end of the NMOS 35 and ground (GND) is formed, the NMOS 35 is turned off in step S521 and the battery 30 is not recharged.

As described above, a voltage within the specific range is greater than the preset maximum recharge voltage and lower than the full recharge voltage.

The preset maximum recharge voltage is a reference voltage determined between an over-discharge protection voltage of the battery and a voltage when the portable device is automatically turned off according to a design of the battery. However, the preset maximum recharge voltage is not limited to 2.4 V to 3 V, but may be changed according to a type and characteristics of a battery provided with the portable device 1.

A voltage when the portable device 1 is automatically turned off may be 3 V, but is not limited to this and may be changed according to a type and characteristics of a battery provided with the portable device 1. For example, when the battery is discharged to a voltage when the portable device 1 is automatically turned off, the controller 160 outputs a message "The battery is low. The device will be automatically turned off." on a display, and may then turn the portable device 1 off.

The full recharge voltage is a voltage when the battery is fully recharged, preferably 4.2 V. However, the full recharge voltage is not limited to 4.2 V, but may be changed according to a type and characteristics of a battery provided with the portable device 1.

Moreover, the maximum recharge current is a maximum current for the USB power supply to the battery, preferably 500 mA. However, the maximum recharge current is not limited to 500 mA, but may be changed according to a type and characteristics of a battery provided with the portable device 1.

As apparent from the above description, in a case of using a recharge circuit proposed in exemplary embodiments of the present invention, a recharge current which is greater than that of a conventional recharge circuit is supplied to a battery so that recharge efficiency of a battery can be improved. In other words, when the recharge circuit is used in a case where the battery is discharged until a portable device is automatically turned off, the battery can be recharged with the maximum recharge current of a USB, that is, 500 mA. Therefore, in comparison to the conventional recharge circuit, time required to recharge a battery can be reduced by as much as a half of that of the conventional recharge circuit and power consumption for the recharge of a battery can be also reduced.

While the invention has been shown and with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for recharging a battery of a portable device comprising:
    a voltage detector for detecting a voltage of the battery and for generating a signal for turning on a switch when the detected voltage is a voltage within a specific range;
    a manipulator for receiving the signal from the voltage detector and for manipulating the switch;
    a switch unit for turning the switch one of on and off based on the manipulator; and
    a resistor for adjusting a quantity of an electric current to be supplied to the battery.

2. The apparatus of claim 1, wherein, when the detected voltage of the battery is a preset maximum recharge voltage, the battery is recharged with a maximum recharge current of a universal serial bus (USB).

3. The apparatus of claim 2, wherein the preset maximum recharge voltage is a voltage between an over-discharge protection voltage of the battery and a voltage when the portable device is automatically turned off.

4. The apparatus of claim 1, wherein the manipulator comprises an AND gate for a logical value of "HIGH" when the detected voltage of the battery is the voltage within the specific range.

5. The apparatus of claim 1, wherein the switch unit comprises an N-channel metal oxide semiconductor (NMOS) turned on to deliver a recharge current to the battery when a logical value of "HIGH" is input from the manipulator.

6. The apparatus of claim 1, wherein the resistor is variably set according to a preset maximum recharge voltage.

7. The apparatus of claim 1, wherein the voltage within the specific range is a voltage greater than an over-discharge protection voltage of the battery and less than a full recharge voltage of the battery.

8. The apparatus of claim 1, further comprising:
    a diode for preventing a recharge current from flowing back;
    a USB cable for delivering a USB voltage and a current supplied from a USB power supply to the portable device; and
    a data communication port for applying the USB voltage and the USB current delivered through the USB cable to the diode.

9. A method of recharging a battery of a portable device, comprising:
    detecting a voltage of the battery by a recharge unit of the portable device; and
    recharging the battery with a maximum recharge current when the detected voltage of the battery is a preset maximum recharge voltage.

10. The method of claim 9, wherein the recharging of the battery comprises:
    supplying a voltage and a current from a USB power supply to the data communication port; and
    recharging the battery, by a recharge circuit, with a recharge current when a voltage of the battery is a voltage within a specific range.

11. The method of claim 10, wherein the recharging of the battery with the recharge current comprises:
    detecting the voltage of the battery within the specific range by a voltage detector;
    receiving the voltage through the data communication port; and
    turning a switch on to deliver the recharge current to the battery when the voltage of the battery is the voltage within the specific range.

12. The method of claim 11, wherein the voltage within the specific range is a voltage greater than a preset maximum recharge voltage of the battery and lower than a full recharge voltage.

13. The method of claim 12, wherein the preset maximum recharge voltage is a voltage between an over-discharge protection voltage of the battery and a voltage when the portable device is automatically turned off.

14. The method of claim 9, further comprising:
    detecting, by a recharge unit of the portable device, a voltage exceeding the preset maximum recharge voltage of the battery and lower than a full recharge voltage; and
    recharging, by the recharge unit, the battery with a recharge current based on the detected voltage of the battery when the detected voltage is a voltage exceeding the preset maximum recharge voltage of the battery and lower than a full recharge voltage.

15. The method of claim 14, wherein the recharge current is substantially the same as the maximum recharge current of a USB at the preset maximum recharge voltage, and decreases at a preset ratio as the voltage of the battery increases.

16. The method of claim 15, wherein the preset maximum recharge voltage is a voltage when the battery is discharged and the portable device is automatically turned off.

17. The method of claim 15, wherein the preset maximum recharge voltage is determined between an over-discharge protection voltage of the battery and a voltage when the portable device is automatically turned off.

18. A method of recharging a battery of a portable device, comprising:

determining, by a recharge unit of the portable device, a voltage of the battery;

recharging, by the recharge unit, the battery with a maximum recharge current when the voltage of the battery is a preset maximum recharge voltage as a result of the determination; and recharging, by the recharge unit, the battery with a recharge current based on the voltage of the battery when the voltage of the battery exceeds the preset maximum recharge voltage and is lower than a full recharge voltage as a result of the determination.

19. The method of claim 18, wherein the preset maximum recharge voltage is a voltage between an over-discharge protection voltage of the battery and a voltage when the portable device is automatically turned off.

20. The method of claim 18, wherein the recharge current is substantially the same as the maximum recharge current at the preset maximum recharge voltage, and decreases at a preset ratio as the voltage of the battery increases.

* * * * *